(12) United States Patent
Khan

(10) Patent No.: US 10,529,075 B2
(45) Date of Patent: Jan. 7, 2020

(54) METHOD AND SYSTEM FOR TRACKING OBJECTS WITHIN A VIDEO

(71) Applicant: Wipro Limited, Bangalore (IN)

(72) Inventor: Ghulam Mohiuddin Khan, Bangalore (IN)

(73) Assignee: Wipro Limited, Bangalore (IN)

( * ) Notice: Subject to any disclaimer, the term of this patent is extended or adjusted under 35 U.S.C. 154(b) by 61 days.

(21) Appl. No.: 15/921,856

(22) Filed: Mar. 15, 2018

(65) Prior Publication Data

US 2019/0236790 A1 Aug. 1, 2019

(30) Foreign Application Priority Data

Jan. 26, 2018 (IN) .............................. 201841003127

(51) Int. Cl.
*G06T 7/20* (2017.01)
*G06T 7/215* (2017.01)
*G06K 9/32* (2006.01)
*G06T 7/11* (2017.01)
*G06T 7/246* (2017.01)

(52) U.S. Cl.
CPC ............ *G06T 7/215* (2017.01); *G06K 9/3233* (2013.01); *G06T 7/11* (2017.01); *G06T 7/246* (2017.01); *G06T 2207/10016* (2013.01); *G06T 2207/30241* (2013.01)

(58) Field of Classification Search
CPC ..................... G06K 9/3233; G06T 7/11; G06T 2207/10016; G06T 2207/30241
See application file for complete search history.

(56) References Cited

U.S. PATENT DOCUMENTS

| 5,764,283 | A | 6/1998 | Pingali et al. |
| 6,668,080 | B1 * | 12/2003 | Torr ........................ G06T 17/10 382/107 |
| 7,684,592 | B2 | 3/2010 | Paul et al. |
| 9,390,506 | B1 * | 7/2016 | Asvatha Narayanan ..................... G06T 7/194 |
| 2011/0286631 | A1 | 11/2011 | Wagner et al. |
| 2014/0015930 | A1 * | 1/2014 | Sengupta ............ G06K 9/00771 348/46 |
| 2014/0254923 | A1 * | 9/2014 | Vidal Calleja ....... G06K 9/4676 382/159 |
| 2016/0171311 | A1 * | 6/2016 | Case ................... G06K 9/00771 382/103 |
| 2017/0243078 | A1 * | 8/2017 | Loui .................... G06K 9/4671 |

* cited by examiner

*Primary Examiner* — Qian Yang
(74) *Attorney, Agent, or Firm* — Pepper Hamilton LLP

(57) ABSTRACT

This disclosure relates generally to computer vision, and more particularly to method and system for tracking objects within a video. In one embodiment, a method for tracking objects within a video is disclosed. The method includes receiving one or more regions of interest (ROIs) corresponding to one or more objects in an initial frame of the video, extracting a set of scale and rotation invariant interest data points in each of the ROIs, clustering the set of scale and rotation invariant interest data points in a ROI into a set of clusters based on corresponding locations in the ROI, determining an optimal set of interest data points from each of the set of clusters based on corresponding feature response values and spread values, and initiating tracking of the optimal set of interest data points in subsequent frames of the video to track the one or more objects in the video.

20 Claims, 7 Drawing Sheets

METHOD AND SYSTEM FOR TRACKING OBJECTS WITHIN A VIDEO

This application claims the benefit of Indian Patent Application Serial No. 201841003127 filed Jan. 26, 2018 which is hereby incorporated by reference in its entirety.

FIELD

This disclosure relates generally to computer vision, and more particularly to method and system for tracking objects within a video.

BACKGROUND

Computer vision in general and real-time object tracking in particular has numerous applications such as surveillance systems, augmented reality (AR), human computer interaction (HCI), medical imaging, and so forth. As will be appreciated, there are a number of techniques for tracking objects in real-time. Such techniques may be broadly categorized into point based tracking, kernel based tracking, and contour based tracking.

However, tracking objects in real-time using existing techniques on low-end electronic devices (e.g., embedded devices, cameras, mobile phones with low computational capability, etc.) may be quite challenging due to hardware constraints (e.g., low computational capability) of such devices. In real world applications, once the objects are tracked in a frame sequence, per frame processing such as augmenting on the tracked objects, estimating pose of the object, and so forth may further bring down the real-time performance of such devices. The impact on performance of the devices may further result in missing tracks in the frame sequences, thereby impacting performance of the tracking technique itself. In other words, existing techniques are inefficient, slow, and not robust particular on the low-end electronic devices. Moreover, existing techniques are limited because of a tradeoff between the speed of tracking and the robustness of tracking.

SUMMARY

In one embodiment, a method for tracking objects within a video is disclosed. In one example, the method may include receiving one or more regions of interest (ROIs) corresponding to one or more objects in an initial frame of the video. The method may further include extracting a set of scale and rotation invariant interest data points in each of the ROIs. The method may further include clustering the set of scale and rotation invariant interest data points in a ROI into a set of clusters based on corresponding locations in the ROI. The method may further include determining an optimal set of interest data points from each of the set of clusters based on corresponding feature response values and spread values. The method may further include initiating tracking of the optimal set of interest data points in subsequent frames of the video to track the one or more objects in the video.

In one embodiment, a system for tracking objects within a video is disclosed. In one example, the system may include at least one processor and a memory communicatively coupled to the at least one processor. The memory may store processor-executable instructions, which, on execution, may cause the processor to receive one or more regions of interest (ROIs) corresponding to one or more objects in an initial frame of the video. The processor-executable instructions, on execution, may further cause the processor to extract a set of scale and rotation invariant interest data points in each of the ROIs. The processor-executable instructions, on execution, may further cause the processor to cluster the set of scale and rotation invariant interest data points in a ROI into a set of clusters based on corresponding locations in the ROI. The processor-executable instructions, on execution, may further cause the processor to determine an optimal set of interest data points from each of the set of clusters based on corresponding feature response values and spread values. The processor-executable instructions, on execution, may further cause the processor to initiate tracking of the optimal set of interest data points in subsequent frames of the video to track the one or more objects in the video.

In one embodiment, a non-transitory computer-readable medium storing computer-executable instructions for tracking objects within a video is disclosed. In one example, the stored instructions, when executed by a processor, may cause the processor to perform operations including receiving one or more regions of interest (ROIs) corresponding to one or more objects in an initial frame of the video. The operations may further include extracting a set of scale and rotation invariant interest data points in each of the ROIs. The operations may further include clustering the set of scale and rotation invariant interest data points in a ROI into a set of clusters based on corresponding locations in the ROI. The operations may further include determining an optimal set of interest data points from each of the set of clusters based on corresponding feature response values and spread values. The operations may further include initiating tracking of the optimal set of interest data points in subsequent frames of the video to track the one or more objects in the video.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
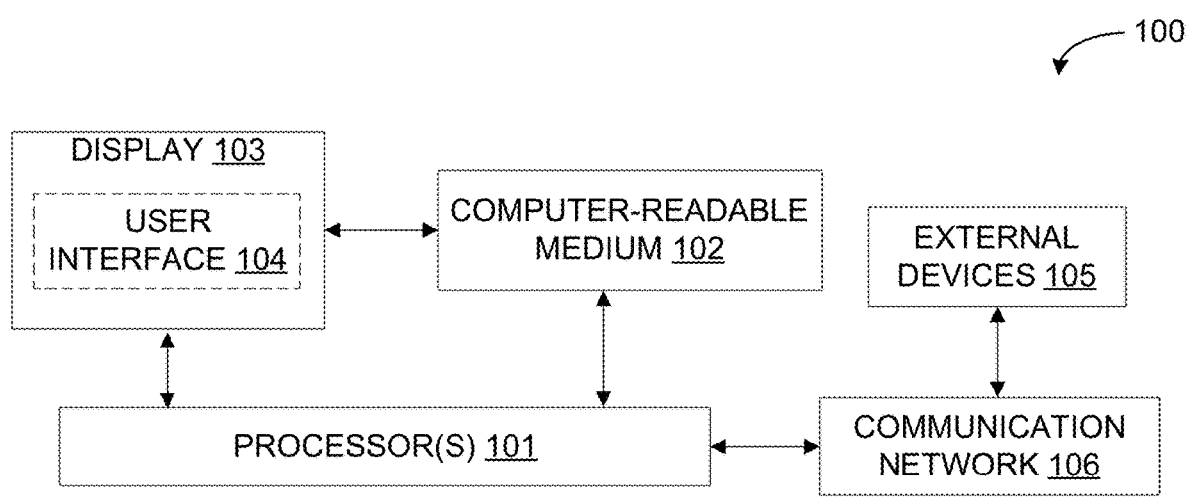
FIG. 1 is a block diagram of an exemplary system for tracking objects within a video in accordance with some embodiments of the present disclosure.

Referring now to FIG. 1, an exemplary system 100 for tracking objects within a video is illustrated in accordance with some embodiments of the present disclosure. In particular, the system 100 may include a tracking device (e.g., server, desktop, laptop, notebook, netbook, tablet, smartphone, mobile phone, or any other computing device) that implements a tracking engine so as to track objects within the video. It should be noted that, in some embodiments, the tracking device may be a low computational capability computing device such as embedded devices, cameras, mobile phones with low computational capability, and so forth. As will be described in greater detail in conjunction with FIGS. 2-5, the tracking engine may receive one or more regions of interest (ROIs) corresponding to one or more objects in an initial frame of the video, extract a set of scale and rotation invariant interest data points in each of the ROIs, cluster the set of scale and rotation invariant interest data points in a ROI into a set of clusters based on corresponding locations in the ROI, determine an optimal set of interest data points from each of the set of clusters based on corresponding feature response values and spread values, and initiate tracking of the optimal set of interest data points in subsequent frames of the video to track the one or more objects in the video.

The system 100 may include one or more processors 101, a computer-readable medium (e.g., a memory) 102, and a display 103. The computer-readable storage medium 102 may store instructions that, when executed by the one or more processors 101, cause the one or more processors 101 to track objects within the video in accordance with aspects of the present disclosure. The computer-readable storage medium 102 may also store various data (e.g., frames of the video, ROIs, scale and rotation invariant interest data points, clusters, optimal set of interest data points, feature response values for data points, spread values for data points, grid indices, active data points, orientations between active data points, distance between active data points, symmetry between active data points, outlier data points, threshold for number of active data points, etc.) that may be captured, processed, and/or required by the system 100. The system 100 may interact with a user via a user interface 104 accessible via the display 103. The system 100 may also interact with one or more external devices 105 over a communication network 106 for sending or receiving various data. The external devices 105 may include, but are not limited to, a remote server, a digital device, or another computing system.

Figure 2:
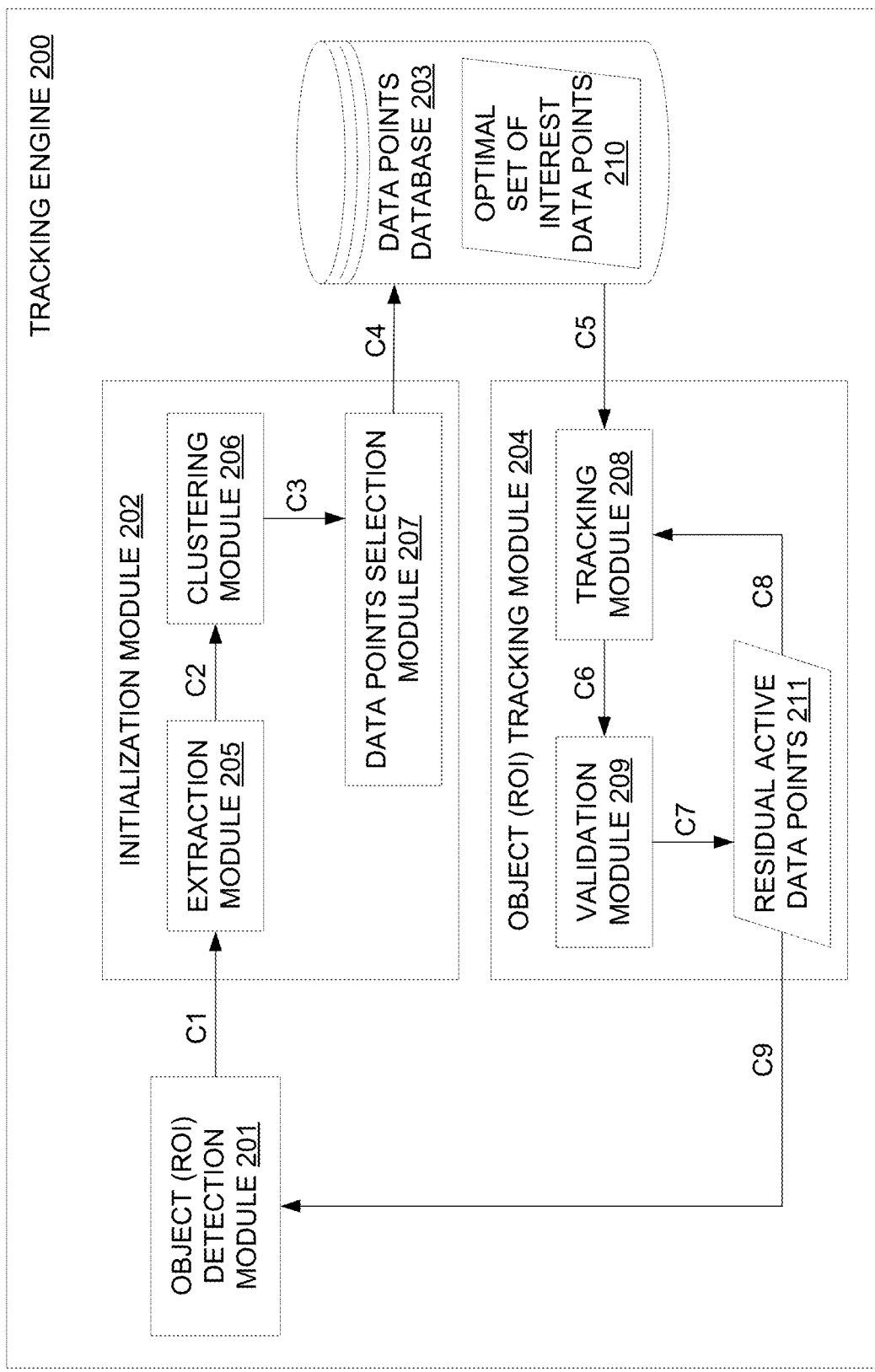
FIG. 2 is a functional block diagram of a tracking engine in accordance with some embodiments of the present disclosure.

Referring now to FIG. 2, a functional block diagram of the tracking engine 200, implemented by the system 100 of FIG. 1, is illustrated in accordance with some embodiments of the present disclosure. The tracking engine 200 may include various modules that perform various functions so as to perform tracking of objects within the video. In some embodiments, the tracking engine 200 may include an object (ROI) detection module 201, an initialization module 202, a data points database 203, and an object or a ROI tracking module 204. Additionally, in some embodiments, the initialization module 202 may further include an extraction module 205, a clustering module 206, and a data points selection module 207. Further, in some embodiments, the object (ROI) tracking module 204 may further include a tracking module 208 and a validation module 209. As will be appreciated by those skilled in the art, all such aforementioned modules and the database 201-209 may be represented as a single module or a combination of different modules. Moreover, as will be appreciated by those skilled in the art, each of the modules and the database 201-209 may reside, in whole or in parts, on one device or multiple devices in communication with each other.

The object (ROI) detection module 201 may detect one or more objects in an initial or a real-time frame of the video. As will be appreciated, the detected objects may be tracked and analyzed in subsequent frame sequences of the video. In some embodiments, the object (ROI) detection module 201 may return an array of detected objects. The location of each object in the initial frame may be defined by a bounding box, also referred to as the ROI. Thus, the bounding box containing the object of interest may act as the ROI for the tracking engine.

The initialization module 202 may select spread out and high feature response value data points as an optimal set of interest data points 'M' from a given ROI. It should be noted that the optimal set of interest data points 'M' may be tracked be tracked in real-time by the tracking engine. As stated above, in some embodiments, the initialization module 202 may include the extraction module 205, the clustering module 206, and the data points selection module 207.

The extraction module 205 may receive the detected bounding box (i.e., the ROI) for each of the objects to be tracked from the object (ROI) detection module 201 via a connection C1. The extraction module 205 may then extract the scale and rotation invariant interest data points (e.g., pixels) in each of the ROIs. As will be appreciated, the scale and rotation invariant interest data points are extracted for a given ROI in the initial frame of the video. In some embodiments, the set of scale and rotation invariant interest data points may be extracted based on the corresponding feature response values and spread values within the ROI. It should be noted that, in some embodiments, the set of scale and rotation invariant interest data points cover at least a substantial portion of boundaries of the ROI. Further, it should be noted that, a number of data points (N) within the set of scale and rotation invariant interest data points may be determined based on at least one of a required speed of tracking and a required robustness of tracking.

The clustering module 206 may receive the extracted scale and rotation invariant interest data points for each of the ROIs from the extraction module 205 via a connection C2. The clustering module 206 may then cluster the set of scale and rotation invariant interest data points in a ROI, based on corresponding locations in the ROI, into a set of clusters. In some embodiments, the clustering module 206 may cluster the extracted scale and rotation invariant interest data points into K-clusters based on their co-ordinates (i.e., locations in the ROI) proximity to the cluster centroids. It should be noted that the hyper-parameter 'K' may be selected based on the size of the ROI in the initial frame of the video.

The data points selection module 207 may receive the clustered scale and rotation invariant interest data points for each of the ROIs from the clustering module 206 via a connection C3. The data points selection module 207 may then determine an optimal set of interest data points 210 from each of the set of clusters based on corresponding feature response values and spread values. As will be appreciated, feature response value for a given data point within a ROI may be based on a significance of the given data point in accurately representing the ROI. For example, data points with high feature response values may include, but are not limited to, corner data points, edge data points, gradient data points, minimum data points, and maximum data points. Similarly, spread value for a given data point within a ROI may be based on a significance of the given data point in adequately covering the ROI.

In some embodiments, the data points selection module 207 may determine the optimal set of interest data points 210 from each of the clusters by splitting the ROI into a number of grid cells, assigning the clustered scale and rotation invariant interest data points corresponding grid indices based on corresponding locations in the grid cells, and selecting the optimal set of interest data points 210 based on the corresponding feature response values and the corresponding grid indices. As will be appreciated, the grid indices correspond to the spread values of the data points within a given grid cell. Thus, the ROI may be split into grid cells, and the clustered N data points may be assigned grid indices along with their cluster indices. The selection of optimal data points from a cluster may then be performed based on the feature response values and grid indices.

In some embodiments, the data points selection module 207 may select the 'M/K' interest data points from each of the 'K' clusters as the optimal set of interest data points 210. It should be noted that the number of interest data points (M/K) to be selected for the optimal set of interest data points 210 may be defined by a hyper-parameter 'M'. Further, it should be noted that the hyper-parameter 'M' may be minimal data points (M) pre-defined for the tracking device based on a computational capability of the tracking device. In some embodiments, the hyper-parameter 'M' may be automatically adjusted based on a computational capability of the tracking device. As will be appreciated, the number of interest data points (M/K) in the optimal set of interest data points 210 may be an optimal number of data points to perform speedy as well as robust tracking for a given tracking device.

The data points database 203 may receive the optimal set of interest data points 210 (i.e., selected data points) from the data points selection module 207 via a connection C4. The data points database 203 may then store the selected optimal set of interest data points 210. It should be noted that the process of determining the optimal set of interest data points 210 may be performed only once during initialization of the tracking engine 200. Further, it should be noted that the optimal set of interest data points 210 may be a reduced number of data points but may be spread out prominent data points, thereby facilitating fast and robust tracking of the objects.

As will be described in greater detail below, the optimal set of interest data points 210 may be employed by the object (ROI) tracking module 204 for tracking detected objects in real time. For example, the optimal set of interest data points 210 may be initial set of data points to initialize the object tracking. Additionally, the optimal set of interest data points 210 may act as reference set for the validation of the tracked data points. For example, the symmetry of the optimal set of interest data points 210 may be used to remove outlier data points during tracking in subsequent frame sequences of the video.

The object (ROI) tracking module 204 may track the detected objects bounding boxes (i.e., ROIs) through subsequent frame sequences. As stated above, in some embodiments, the object (ROI) tracking module 204 may include a tracking module 208 and a validation module 209. The tracking module 208 may receive the optimal set of interest data points 210, in the reference frame (i.e., the initial frame) to be tracked through frame sequences, from the data points database 203 via a connection C5. The tracking module 208 may then track the optimal set of interest data points 210, and find their matching locations in the instant frame.

As will be appreciated, the optimal set of interest data points 210 selected in the ROI of the initial frame during initialization of the tracking engine 200 may be used to start the ROI tracking. The data points tracked in the second frame may be considered as active data points (validated tracked data points) for the third frame. Further, the active data points in the second frame may be employed for tracking ROI in the third frame, and so on. Thus, the optimal set of interest data points are tracked by iteratively determining locations of active data points from among the optimal set of interest data points in each of the subsequent video frames. Further, the tracked data points in a frame may be validated based on the reference optimal set of interest data points, and the valid data points may be considered as the active data points to be tracked in the next frame. It should be noted that when the number of active data points in any frame is reduced to less than a predefined threshold (T), the tracking module 208 may abandon the tracking, and invoke fresh ROI detection instead.

The validation module 209 may receive the tracked interest data points in an instant frame from the tracking module 208 via a connection C6. The validation module 209 may then identify outlier data points with respect to the reference interest data points (i.e., optimal set of interest data points 210 computed during the initialization of the tracking engine 200). Thus, the validation module 209 may validate the tracked data points in a frame based on the reference optimal set of interest data points 210 computed during the initialization of the tracking engine 200. Further, the validation module 209 may filter out the identified outlier data points, thereby leaving the filtered data points 211 for tracking the object in the subsequent frames.

In some embodiments, the validation module 209 validates the active data points based on at least one of an orientation, a distance, or a symmetry between two or more of the active data points in each of the subsequent video frames, and remove outlier active data points based on the validation. Thus, the validation module 209 may use the symmetry and positioning of the reference interest data points and the matched data points in the current frame to filter the outlier active data points. A connection C7 may define residual active data points 211 left after filtering outliers.

As will be appreciated, the residual active data points 211 are the data points to be tracked for the next frame. In other words, the residual active data points 211 are the data points in the current frame of the video that may be persisted, and that may be used for tracking the objects in the next frame. The tracking module 208 may receive the residual active data points 211 for tracking the objects in the next frame via a connection C8.

As the tracking in frame sequences progresses, the number of residual active data points 211 may keep reducing. Thus, when the residual active data points become less than a predefined threshold (T), the tracking may be terminated. In such cases, the object (ROI) tracking module 204 may invoke the object (ROI) detection module 201 to re-detect the objects in the current frame via a connection C9. The tracking engine 200 may then restart the tracking after initialization by the initialization module 202 for the re-detected ROIs. It should be noted that, in some embodiments, the predefined threshold (T) may be based on the end application. For example, if the purpose of the tracking is pose estimation, the pre-defined threshold (T) may be 4. However, if the purpose of the tracking is tracking a moving object (e.g., a cricket ball during a live match), the pre-defined threshold (T) may be 8.

As will be appreciated, each of the connections, C1-C9, may acquire or transfer data from one module or the database 201-209 to the other module or the database 201-209 using standard wired or wireless data connections means. For example, each of the connections, C1-C9, may employ one or more connection protocols including, but not limited to, serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, and PCIe.

By way of an example, the tracking engine 200 described above may perform fast and robust tracking of objects in real-time on a computing device (e.g., low computational capability devices) using clustering and grid based mechanism. The tracking engine 200 may be fed with regions of interest (ROIs) in an initial frame (e.g., real-time frame) of the video which needs to be tracked in successive frames of the video. The ROIs may be output from the object (ROI) detection module 201 representing objects' bounding boxes in the initial frame which are to be tracked and augmented in frame sequences. The speed of tracking may be directly proportional to the number of ROIs to be tracked in the frame sequences.

The tracking engine 200 may then determine an optimal set of interest data points in each of the input ROIs which are to be tracked so as to locate the ROIs in successive frames. As will be appreciated, the speed of tracking may be dependent on the number of data points in the optimal set. Thus, in some embodiments, the optimal set includes a minimum number of data points that are good enough for tracking. However, the tracking robustness may decrease with decrease in the number of data points in the optimal set. So the optimal set of interest data points may be selected in such a way that the data points cover most parts of the ROIs boundaries. Such selection of data points may add to the robustness during tracking even in case of partial occlusions. Further, orientations, distances, symmetry between the interest data points may be used to re-validate the tracked data points in the successive frames to add further to the robustness of the tracking.

As will be appreciated, unlike the existing tracking techniques, the tracking engine 200 described above employ clustering and grid based mechanism for selecting an optimal set of interest data points thus enhancing the tracker speed. Further, the selection of the optimal set of interest data points may be prioritized based on both location (spread out data points) and feature response values so as to increase the speed of tracking while adding robustness to the tracking. Moreover, such selection of good trackable data points may enhance the occlusion handling capability of the tracking engine 200.

It should be noted that the tracking engine 200 may be implemented in programmable hardware devices such as programmable gate arrays, programmable array logic, programmable logic devices, and so forth. Alternatively, the tracking engine 200 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for tracking objects within a video. For example, the exemplary system 100 and the associated tracking engine 200 may perform tracking of objects within the video by the processes discussed herein. In particular, as will be appreciated by those of ordinary skill in the art, control logic and/or automated routines for performing the techniques and steps described herein may be implemented by the system 100 and the associated tracking engine 200, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 3:
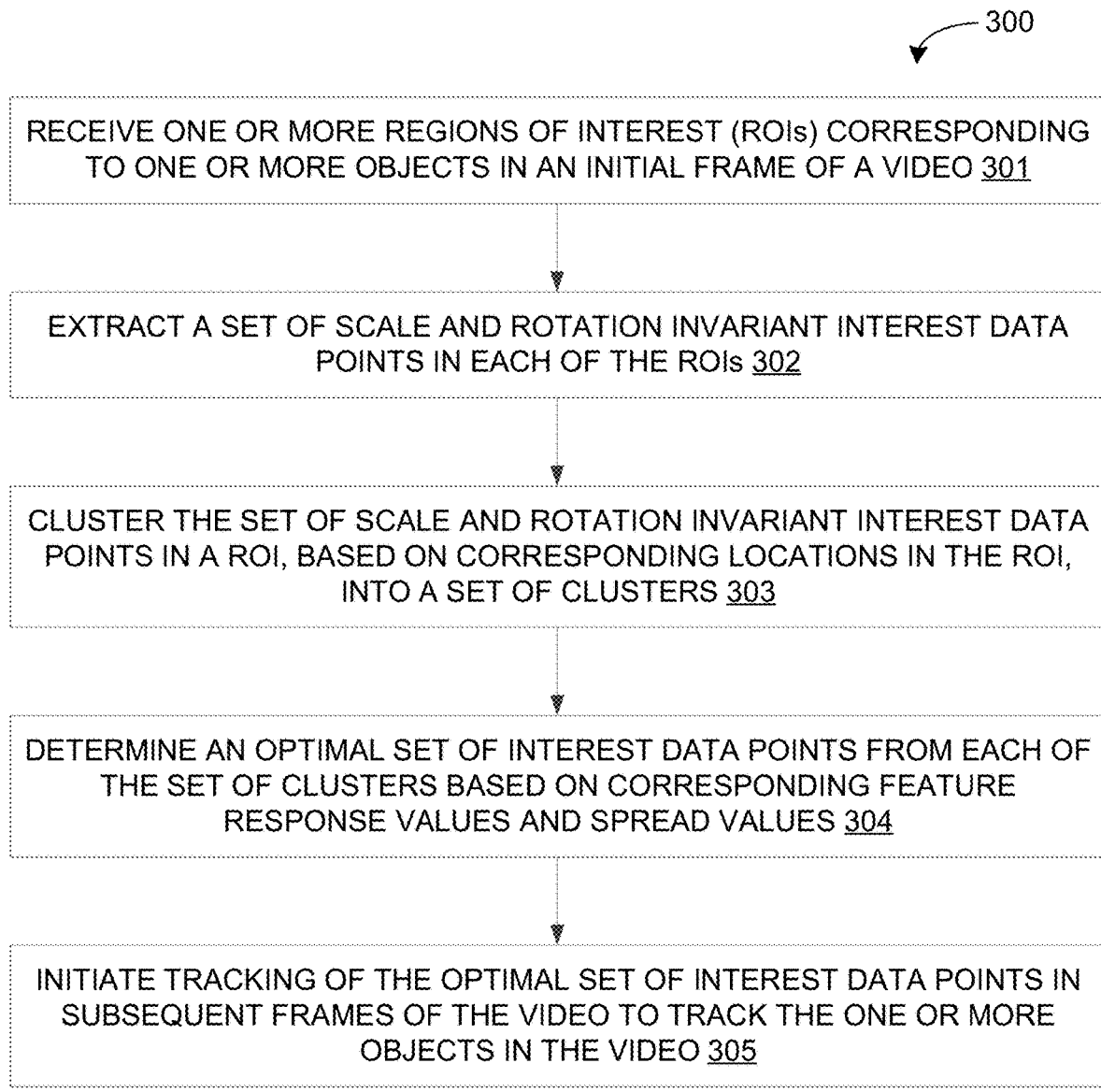
FIG. 3 is a flow diagram of an exemplary process for tracking objects within a video in accordance with some embodiments of the present disclosure.

For example, referring now to FIG. 3, exemplary control logic 300 for tracking objects within a video via a system, such as system 100, is depicted via a flowchart in accordance with some embodiments of the present disclosure. As illustrated in the flowchart, the control logic 300 may include the steps of receiving one or more regions of interest (ROIs) corresponding to one or more objects in an initial frame of the video at step 301, extracting a set of scale and rotation invariant interest data points in each of the ROIs at step 302, clustering the set of scale and rotation invariant interest data points in a ROI into a set of clusters based on corresponding locations in the ROI at step 303, determining an optimal set of interest data points from each of the set of clusters based on corresponding feature response values and spread values at step 304, and initiating tracking of the optimal set of interest data points in subsequent frames of the video to track the one or more objects in the video at step 305. In some embodiments, the control logic 300 may further include the step of detecting the one or more ROIs in the initial video frame. It should be noted that, in some embodiments, each of the one or more ROIs may include a bounding box within which the corresponding object may be located.

In some embodiments, the set of scale and rotation invariant interest data points may be extracted at step 302 based on the corresponding feature response values and spread values within the ROI. Additionally, it should be noted that, in some embodiments, the set of scale and rotation invariant interest data points may cover at least a substantial portion of boundaries of the ROI. Further, in some embodiments, a number of data points (N) within the set of scale and rotation invariant interest data points may be determined based on at least one of a required speed of tracking and a required robustness of tracking.

In some embodiments, the set of scale and rotation invariant interest data points may be clustered at step 303 based on corresponding coordinates proximity to cluster centroids. It should be noted that, in some embodiments, a number of clusters (K) within the set of clusters may be selected based on a size of the ROI.

In some embodiments, the optimal set of interest data points may be determined at step 304 by splitting the ROI into a number of grid cells, assigning the set of scale and rotation invariant interest data points corresponding grid indices based on corresponding locations in the grid cells, and selecting the optimal set of interest data points based on the corresponding feature response values and the corresponding grid indices, wherein the grid indices correspond to the spread values. It should be noted that, in some embodiments, a number of data points (M/K) within the set of optimal interest data points may be determined based on a number of clusters (K) and a number of minimal data points (M) pre-defined for the tracking device based on a computational capability of the tracking device.

In some embodiments, the optimal set of interest data points may be tracked at step 305 by iteratively determining locations of active data points from among the optimal set of interest data points in each of the subsequent video frames. Additionally, in some embodiments, the control logic 300 may further include the steps of validating the active data points based on at least one of an orientation, a distance, or a symmetry between two or more of the active data points in each of the subsequent video frames, and removing outlier active data points based on the validation. Further, in some embodiments, the control logic 300 may include the steps of terminating the tracking if the number of active data points in an instant video frame falls below a pre-defined threshold, and detecting one or more new ROIs in the instant video frame to re-initiate the tracking.

Figure 4:
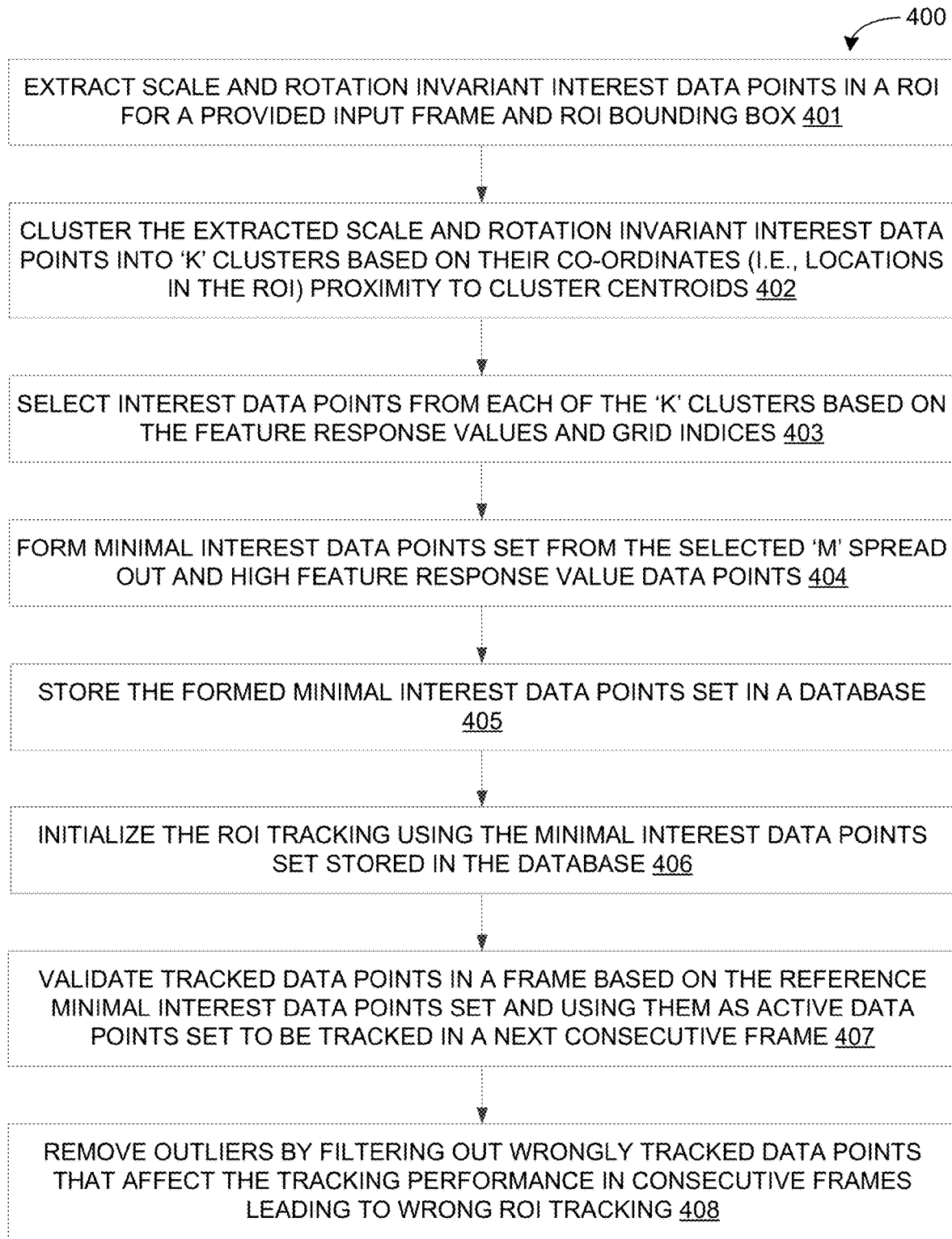
FIG. 4 is a flow diagram of a detailed exemplary process for tracking objects within a video in accordance with some embodiments of the present disclosure.

Referring now to FIG. 4, exemplary control logic 400 for tracking objects in real-time using clustering and grid based mechanism is depicted in greater detail via a flowchart in accordance with some embodiments of the present disclosure. As illustrated in the flowchart, at step 401, the control logic 400 may extract the scale and rotation invariant interest data points in a region of interest (ROI) for a provided input frame and ROI bounding box. Initially, for a given input frame and a ROI bounding box, the scale and rotation invariant interest data points in the ROI may be extracted. As will be appreciated, the extraction of scale and rotation invariant interest data points needs to be fast and accurate. Thus, only the top 'N' data points may be identified and extracted. In some embodiments, the top 'N' data points may be sorted and selected based on the feature response values and spread values in the ROI. It should be noted that the hyper-parameter 'N' should not be so small that the spread out data points are missed. Further, it should be noted that the hyper-parameter 'N' should not be so high that the time required for clustering is high. The spread out interest data points with good response feature values brings the robustness during tracking. The extracted scale and rotation invariant interest data points and their feature response values may be subsequently used during the determination of the optimal set of interest data points.

At step 402, the control logic 400 may cluster the extracted scale and rotation invariant interest data points into 'K' clusters based on their co-ordinates (i.e., locations in the ROI) proximity to cluster centroids. It should be noted that the hyper-parameter 'K' may be selected based on the size of the ROI in the initial image fame of the video. In some embodiments, 'K' should have a minimum value of '4' for ensuring selection of spread out data points within the ROI, thereby ensuring robust and efficient tracking.

At step 403, the control logic 400 may select the interest data points from each of the 'K' clusters based on the feature response values and grid indices. As will be appreciated, the number of data points needs to be reduced so as to improve performance of the control logic 400 in terms of speed. However, the reduction should be performed in such a way that robustness of the control logic 400 is retained and the control logic 400 does not miss the tracked object frequently. The total number of data points to be selected may be defined by a hyper-parameter 'M' which forms the minimal interest data points set. The value of 'M' may depend on the hardware computation capability of the tracking device. As will be appreciated, a higher value of 'M' may slow down the control logic 400 while a lower value of 'M' may affect the robustness of the control logic 400. Once the interest data points are clustered, 'M/K' interest data points may be selected from each of the 'K' clusters.

The ROI may be split into grid cells and the clustered 'N' data points may be assigned grid indices along with their cluster indices. The selection of 'M/K' interest data points from each of the 'K' clusters may be performed based on the feature response values and the grid indices. By way of an example, if a cluster spans '3' grid cells then equal number of interest data points may be selected from each of these grids with priority given to data points with higher feature response values. However, if the number of interest data points to be selected in a grid cell for a cluster are less, then the data points available in that grid may be selected and rest of the data points may be selected from the other grid cells with preference given to the data points with higher features response values.

Further, for example, if a grid cell may fall under two or more clusters, then the number of data points to be selected from the grid cell for a given cluster remains same given that the total data points selected from the grid cell in all the clusters should not exceed the limit of 'M/K' data points. If it exceeds the limit, then the number of data points to be selected for each cluster in that grid cell may be reduced to 'M/K/O' data points where 'O' is the number of clusters whose data points lie in that grid cell and rest of the data points for that cluster may be selected from other grid cells with preference given to data points with higher feature response values.

At step 404, the control logic 400 may form minimal interest data points set from the 'M' spread out and high feature response value data points selected at step 403. The minimal interest data points set may be used as initial set of data points to start ROI tracking in successive frames of the video. The spatial alignment and symmetry of the minimal interest data points set may act as a reference for validating the tracked interest data points in the successive frames of the video. The steps 401-404 may be performed once during initialization of the ROI tracking, and the reduced spread out and prominent minimal interest data points set so determined may facilitate fast and robust tracking of the object.

At step 405, the control logic 400 may store the formed minimal interest data points set in a database. The minimal interest data points set stored in the database may be further used for the real-time tracking of the objects in the successive frames of the video.

At step 406, the control logic 400 may initialize the ROI tracking using the minimal interest data points set stored in the database. The minimal interest data points set selected in the ROI of the initial frame during initialization of the control logic 400 may be used to start the ROI tracking. The data points tracked in the second frame may be considered as active data points (validated tracked data points) for the third frame (i.e., the active data points in the second frame may be used for tracking ROI in the third frame), and so on.

At step 407, the control logic 400 may validate the tracked data points in a frame based on the reference minimal interest data points set. The validated data points may be considered as active data points set to be tracked in a next successive frame. As stated above, when the number of active data points in any frame is reduced to less than a predefined threshold (T), the control logic may abandon tracking and may invoke re-detection of ROI instead.

At step 408, the control logic 400 may remove outliers by filtering out wrongly tracked data points that affect the performance of the control logic 400 in consecutive frames leading to wrong ROI tracking. The tracked interest data points in a current frame may be validated based on the reference minimal interest data points set. As will be appreciated, the validation may be performed to remove outliers by filtering out wrongly tracked data points, which will affect the tracking performance in the consecutive frames leading to wrong ROI tracking.

Figure 5A:
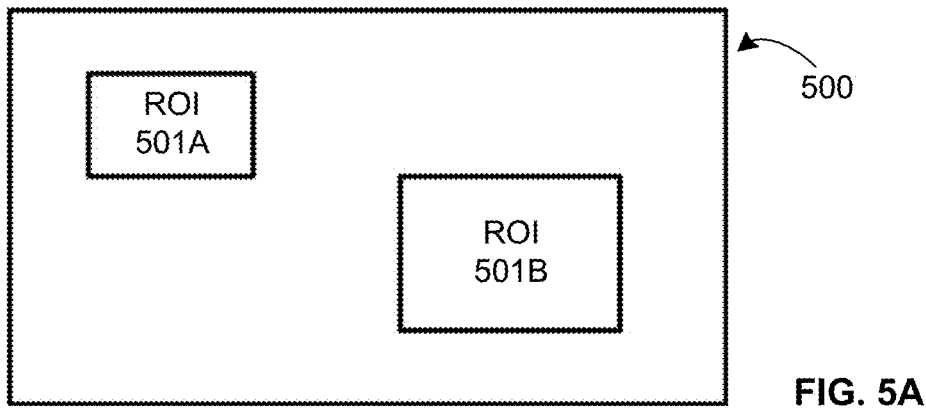
FIGS. 5A-5E illustrate an exemplary scenario for tracking objects within a video in accordance with some embodiments of the present disclosure.
Figure 5B:
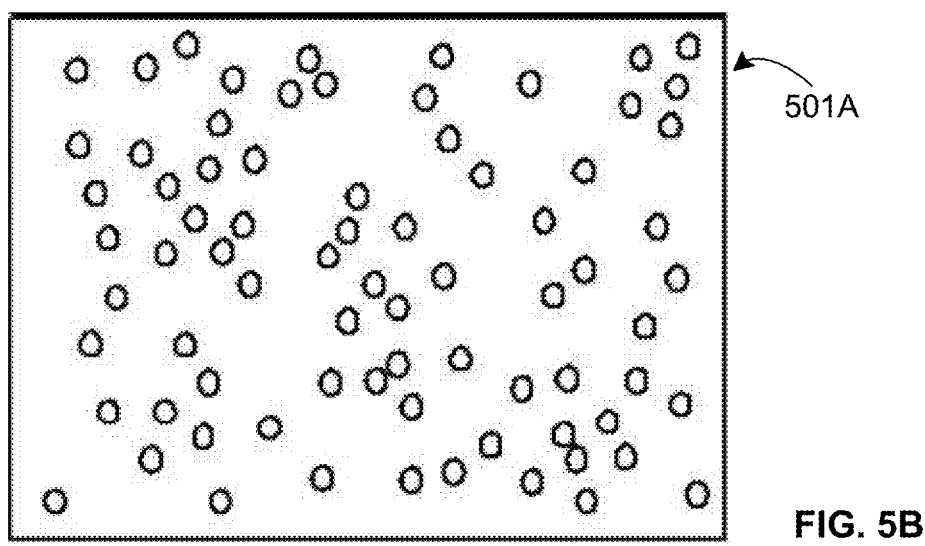

Referring now to FIGS. 5A-5E, an exemplary scenario for tracking objects within a video is illustrated in accordance with some embodiments of the present disclosure. In the exemplary scenario, the objects may be tracked in real-time and analytics may be performed on the tracked objects. As illustrated in FIG. 5A, the object (ROI) detection module 201 may detect the objects in an image frame 500 of the video, and may return ROIs 501A, 501B bounding the objects in the frame 500. Each of the ROIs 501A, 50B may then be passed onto the initialization module 202, which may extract the scale and rotation invariant interest data points in the ROIs 501A, 501B via the extraction module 205. For example, FIG. 5B illustrates the scale and rotation invariant interest data points extracted from the ROI 501A.

Figure 5C:
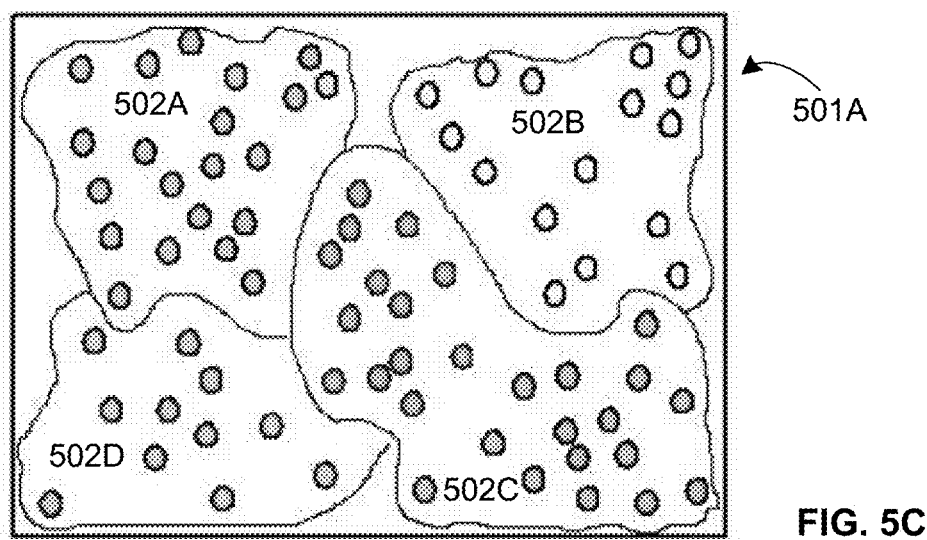

Further, the initialization module 202 may cluster the extracted scale and rotation invariant interest data points into 'K' clusters (e.g., '4' or '5' clusters) via the clustering module 206. For example, FIG. 5C illustrates the scale and rotation invariant interest data points clustered into 4 clusters 502A-502D. Further, the initialization module 202 may select some of the data points from each of the clusters 502A-502D via the data points selection module 207. The number of data points to be selected may be dependent on the hardware capability of the tracking device. Further, the number of data points to be selected should be optimal for a given tracking device. In other words, the number of data points should not be so less that it causes the tracking device to loose the track of object frequently. At the same time, the number of data points should not be so high that it makes the tracking device slow. In some embodiments, a minimum of 50 data points need to be selected for a fast as well as robust tracking.

Figure 5D:
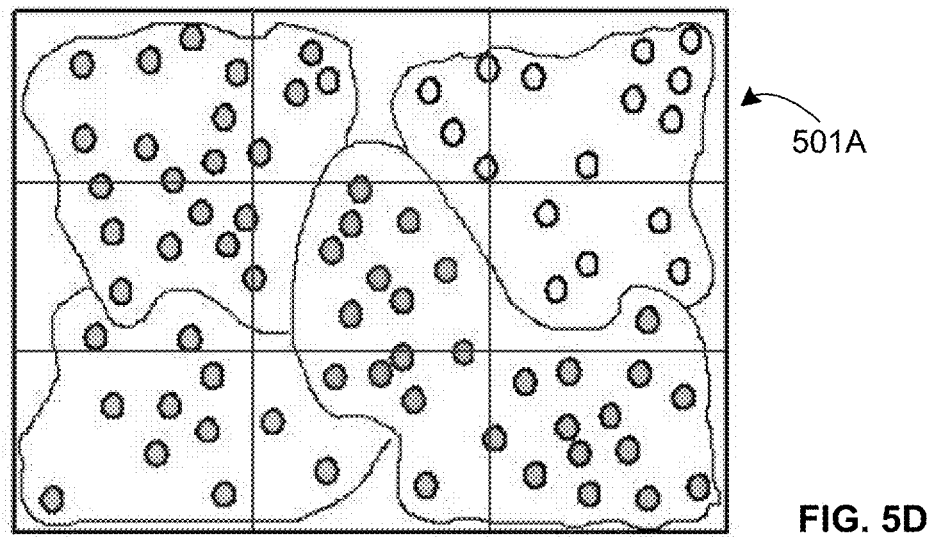
Figure 5E:
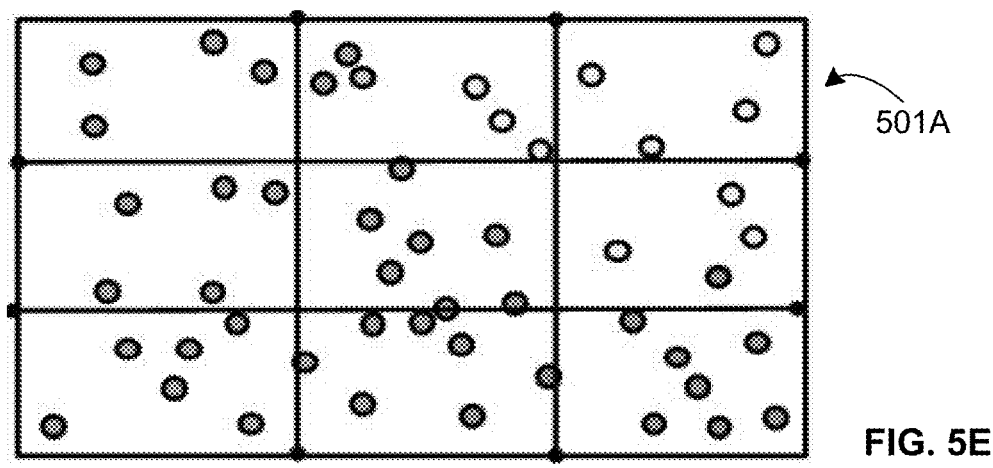

Further, the ROI region may be divided into grid cells (e.g., 3×3 grid having 9 grid cells). For example, FIG. 5D illustrates the ROI 501A with the clustered scale and rotation invariant interest data points divided into 9 grid cells in a 3×3 grid. In some embodiments, the number of grid cells may increase if the ROI region is bigger in size so that the spread out data points may be selected. Further, the grid indices may be assigned to the interest data points and then equal number of interest data points may be selected from each grid cell for a given cluster with priority given to the data points with higher feature response values. The selected interest data points represent the minimal interest data points set. For example, FIG. 5E illustrates the ROI 501A with the minimal interest data points set.

By way of an example, 50 data points need to be selected for a given ROI from among 5 clusters. If there is a cluster with data points lying in three grid cells then, in such case, 3, 3, and 3 data points from each grid cell may be selected and the last data point with highest feature response value from among the remaining data points may be selected. In this manner, 10 data points from each cluster may be selected, therefore providing 50 data points from five clusters. Further, if the grid cell lies in two clusters then half of the data points in that grid cell may be selected from the first cluster and the remaining half from the second cluster need to be selected, with overall number of data points selected from each cluster to be same as 10 data points. The selected spread out high feature response values interest data points (i.e., minimal interest data points set) may act as reference and may be used for triggering the tracking device. In other words, these data points may act as the active data points to be tracked for the next frame. The spatial symmetry and orientations of the minimal interest data points set may be computed, which may act as reference for filtering outlier data points during the tracking process. This is performed for each object ROI and may be stored in the data points database 203 for tracking and processing in real-time.

Further, during tracking of the objects (ROIs), the pre-computed minimal interest data points set stored in the data points database 203 may be used as the active data points by the object (ROI) tracking module 204. The object (ROI) tracking module 204 may determine the matching data points in the current frame (i.e., tracked data points) for the active data points from the previous frame via the tracking module 208. The object (ROI) tracking module 204 may then validate the tracked data points for removing the outliners via the validation module 209. The filtered tracked data points (or the residual active data points) may now become the active data points for the next frame. Additionally, in some embodiments, augment analytics may be performed on each of the tracked objects in real-time.

The tracking process may iteratively continue until the completion of frames of the video, or until the completion of the tracking, or when the number of active data points to be tracked in the next frame falls below the predefined threshold (T). For example, if the number of tracked data points are less than the predefined threshold (T), then the tracking is abandoned. The tracking device may then invoke the object (ROI) detection module 201 so as to re-detect the objects to be tracked. The process may then be repeated by passing the re-detected ROIs corresponding to the objects to the initialization module 202.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
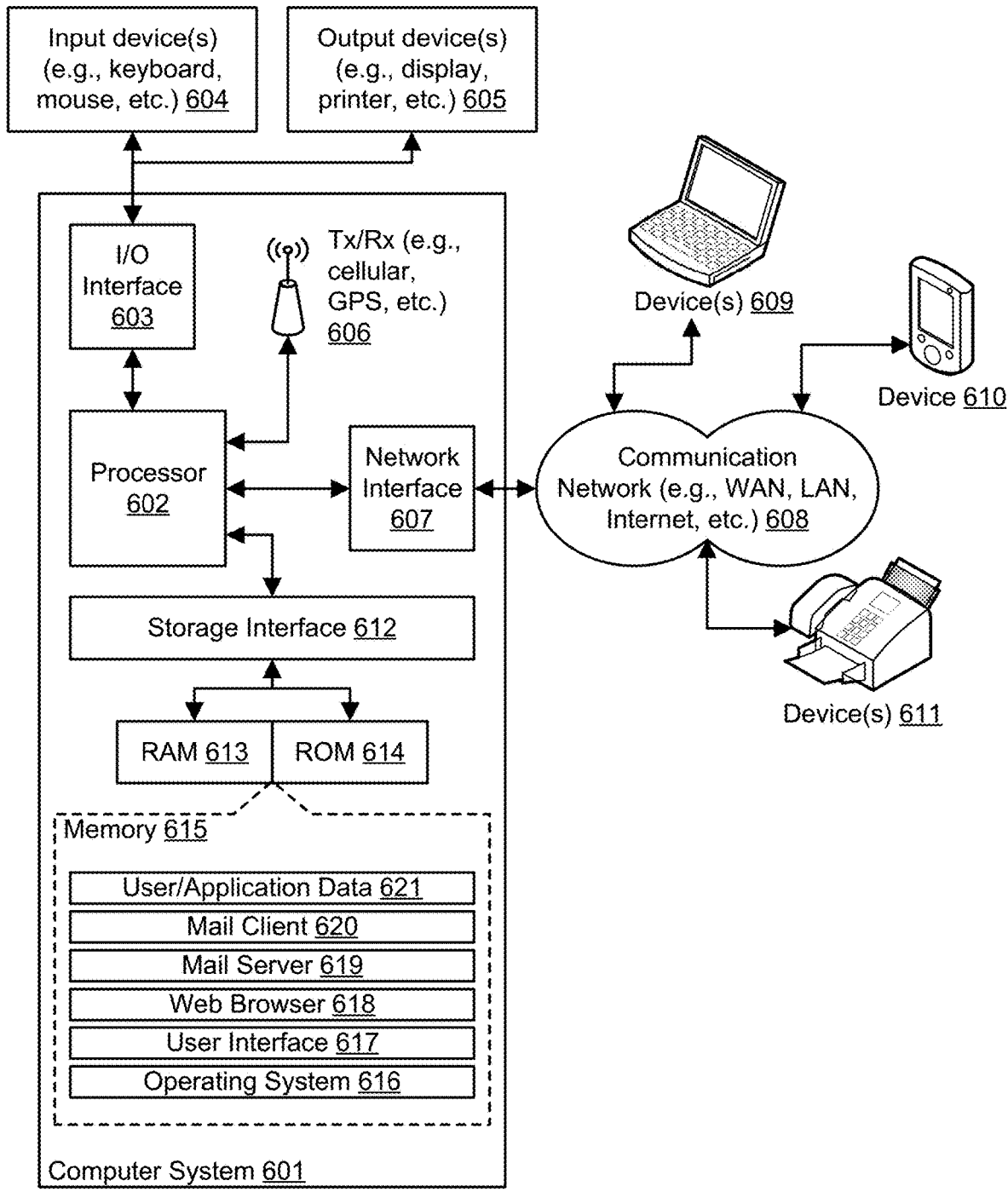
FIG. 6 is a block diagram of an exemplary computer

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing system 100 for tracking objects within a video. Computer system 601 may include a central processing unit ("CPU" or "processor") 602. Processor 602 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), RF antennas, S-Video, video graphics array (VGA), IEEE 602.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9600, or the like), providing IEEE 602.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 602.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 601 may implement a web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C#, Microsoft.NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as Apple Mail, Microsoft Entourage, Microsoft Outlook, Mozilla Thunderbird, etc.

In some embodiments, computer system 601 may store user/application data 621, such as the data, variables, records, etc. (e.g., frames of the video, ROIs, scale and rotation invariant interest data points, clusters, optimal set of interest data points, feature response values for data points, spread values for data points, grid indices, active data points, orientations between active data points, distance between active data points, symmetry between active data points, outlier data points, threshold for number of active data points, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for efficient, speedy, and robust tracking of objects in real-time. The techniques employ a combination of clustering and grid based approach to track objects in frame sequences in a speedy manner while maintaining required robustness. The combination of clustering and grid based approach facilitate selection of optimal set of interest data points in the ROI to be tracked, thereby making it feasible to perform real-time tracking on low-end computing devices (i.e., devices with low computational capability). Additionally, the techniques described above prioritize the selection based on the interest data point's location and feature response values, which enhances the performance of the tracking. Unlike existing techniques, the techniques described in the embodiments discussed above select a reduced set of data points to enhance the tracking speed without compromising much on robustness of the tracking device by selecting spread out data points covering most parts of the ROI to be tracked.

The specification has described method and system for tracking objects within a video. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of tracking objects within a video, the method comprising:
receiving, by a tracking device, one or more regions of interest (ROIs) corresponding to one or more objects in an initial frame of the video;
extracting, by the tracking device, a set of scale and rotation invariant interest data points in each of the ROIs;
clustering, by the tracking device, the set of scale and rotation invariant interest data points in a ROI, based on corresponding locations in the ROI, into a set of clusters;
determining, by the tracking device, an optimal set of interest data points from each of the set of clusters based on corresponding feature response values and spread values wherein the optimal set of interest data points is determined by:
splitting the ROI into a number of grid cells;
assigning the set of scale and rotation invariant interest data points corresponding grid indices based on corresponding locations in the grid cells; and
selecting the optimal set of interest data points based on the corresponding feature response values and the corresponding grid indices, wherein the grid indices correspond to the spread values; and
initiating, by the tracking device, tracking of the optimal set of interest data points in subsequent frames of the video to track the one or more objects in the video.

2. The method of claim 1, further comprising detecting the one or more ROIs in the initial video frame.

3. The method of claim 1, wherein each of the one or more ROIs comprises a bounding box within which the corresponding object is located.

4. The method of claim 1, wherein the set of scale and rotation invariant interest data points are extracted based on the corresponding feature response values and spread values within the ROI.

5. The method of claim 1, wherein the set of scale and rotation invariant interest data points cover at least a substantial portion of boundaries of the ROI.

6. The method of claim 1, wherein a number of data points (N) within the set of scale and rotation invariant interest data points is determined based on at least one of a required speed of tracking and a required robustness of tracking.

7. The method of claim 1, wherein the set of scale and rotation invariant interest data points are clustered based on corresponding coordinates proximity to cluster centroids.

8. The method of claim 1, wherein a number of clusters (K) within the set of clusters is selected based on a size of the ROI.

9. The method of claim 1, wherein a number of data points (M/K) within the set of optimal interest data points is determined based on a number of clusters (K) and a number of minimal data points (M) pre-defined for the tracking device based on a computational capability of the tracking device.

10. The method of claim 1, wherein the optimal set of interest data points are tracked by iteratively determining locations of active data points from among the optimal set of interest data points in each of the subsequent video frames.

11. The method of claim 10, further comprising:
validating the active data points based on at least one of an orientation, a distance, or a symmetry between two or more of the active data points in each of the subsequent video frames; and
removing outlier active data points based on the validation.

12. The method of claim 11, further comprising:
terminating the tracking if the number of active data points in an instant video frame falls below a pre-defined threshold; and
detecting one or more new ROIs in the instant video frame to re-initiate the tracking.

13. A system for tracking objects within a video, the system comprising:
a tracking device comprising at least one processor and a computer-readable medium storing instructions that, when executed by the at least one processor, cause the at least one processor to perform operations comprising:
receiving one or more regions of interest (ROIs) corresponding to one or more objects in an initial frame of the video;
extracting a set of scale and rotation invariant interest data points in each of the ROIs;
clustering the set of scale and rotation invariant interest data points in a ROI, based on corresponding locations in the ROI, into a set of clusters;
determining an optimal set of interest data points from each of the set of clusters based on corresponding feature response values and spread values wherein the optimal set of interest data points is determined by:
splitting the ROI into a number of grid cells;
assigning the set of scale and rotation invariant interest data points corresponding grid indices based on corresponding locations in the grid cells; and
selecting the optimal set of interest data points based on the corresponding feature response values and the corresponding grid indices, wherein the grid indices correspond to the spread values; and
initiating tracking of the optimal set of interest data points in subsequent frames of the video to track the one or more objects in the video.

14. The system of claim 13, wherein the operations further comprise detecting the one or more ROIs in the initial video frame, and wherein each of the one or more ROIs comprises a bounding box within which the corresponding object is located.

15. The system of claim 13, wherein the set of scale and rotation invariant interest data points are extracted based on the corresponding feature response values and spread values within the ROI, and wherein a number of data points (N) within the set of scale and rotation invariant interest data points is determined based on at least one of a required speed of tracking and a required robustness of tracking.

16. The system of claim 13, wherein the set of scale and rotation invariant interest data points are clustered based on corresponding coordinates proximity to cluster centroids, and wherein a number of clusters (K) within the set of clusters is selected based on a size of the ROI.

17. The system of claim 13, wherein the optimal set of interest data points are tracked by iteratively determining locations of active data points from among the optimal set of interest data points in each of the subsequent video frames.

18. The system of claim 17, wherein the operations further comprise:
validating the active data points based on at least one of an orientation, a distance, or a symmetry between two or more of the active data points in each of the subsequent video frames; and
removing outlier active data points based on the validation.

19. The system of claim 18, wherein the operations further comprise:
terminating the tracking if the number of active data points in an instant video frame falls below a pre-defined threshold; and
detecting one or more new ROIs in the instant video frame to re-initiate the tracking.

20. A non-transitory computer-readable medium storing computer-executable instructions for:
receiving one or more regions of interest (ROIs) corresponding to one or more objects in an initial frame of a video;
extracting a set of scale and rotation invariant interest data points in each of the ROIs;
clustering the set of scale and rotation invariant interest data points in a ROI, based on corresponding locations in the ROI, into a set of clusters;
determining an optimal set of interest data points from each of the set of clusters based on corresponding feature response values and spread values wherein the optimal set of interest data points is determined by:
splitting the ROI into a number of grid cells;
assigning the set of scale and rotation invariant interest data points corresponding grid indices based on corresponding locations in the grid cells; and
selecting the optimal set of interest data points based on the corresponding feature response values and the corresponding grid indices, wherein the grid indices correspond to the spread values; and
initiating tracking of the optimal set of interest data points in subsequent frames of the video to track the one or more objects in the video.

* * * * *